March 1, 1932.   A. KOLBASSIEFF   1,847,768
DEVICE FOR PRODUCING INTERMITTENT ROTARY MOTION
Filed May 22, 1930   3 Sheets-Sheet 1
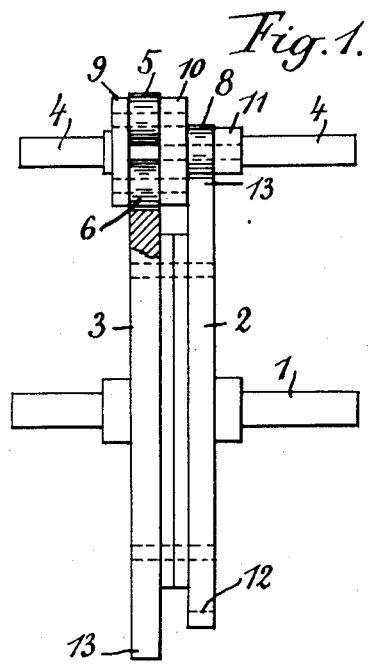
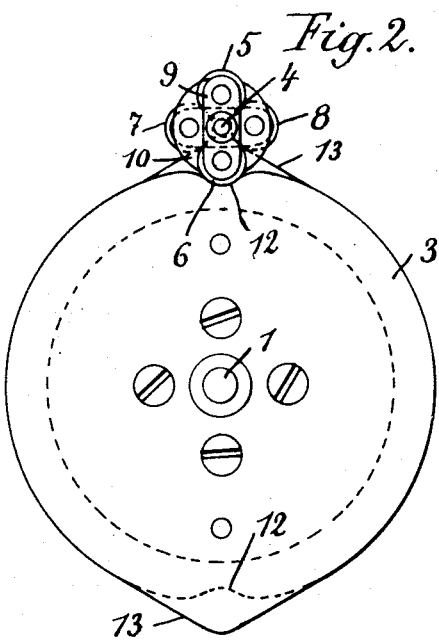
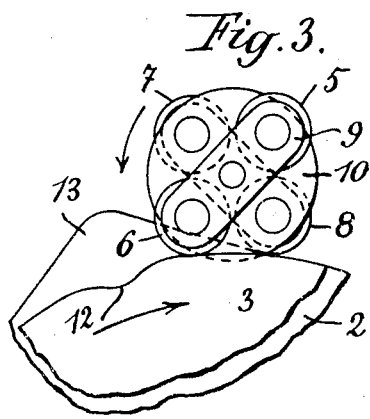
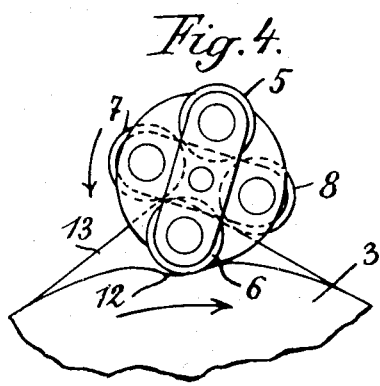
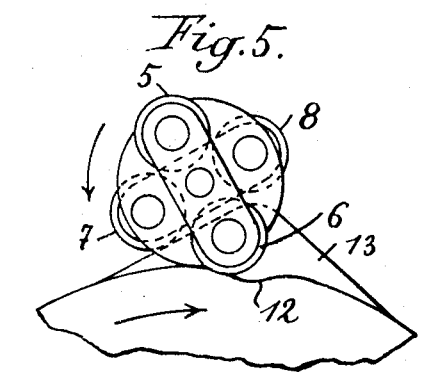
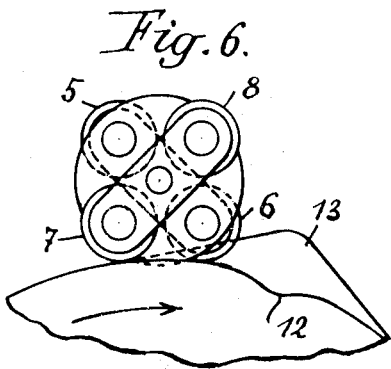
Inventor:
Alexander Kolbassieff.

March 1, 1932.  A. KOLBASSIEFF  1,847,768
DEVICE FOR PRODUCING INTERMITTENT ROTARY MOTION
Filed May 22, 1930    3 Sheets-Sheet 2
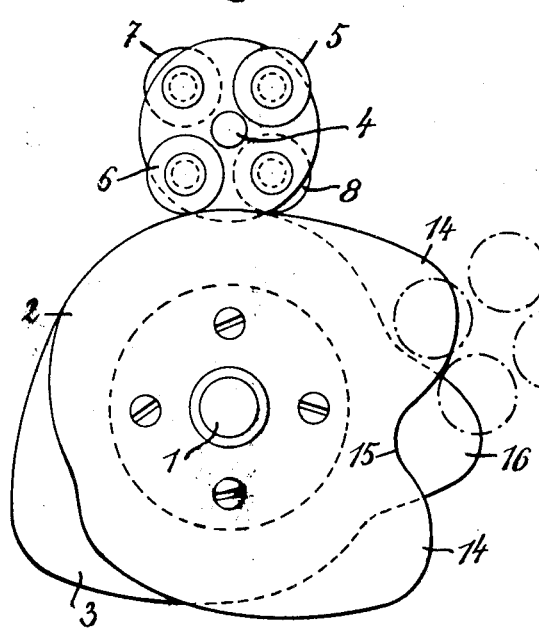
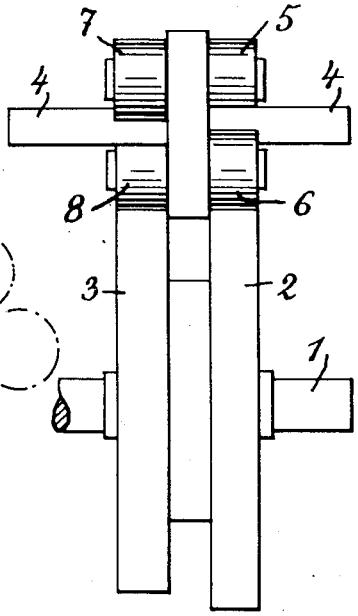
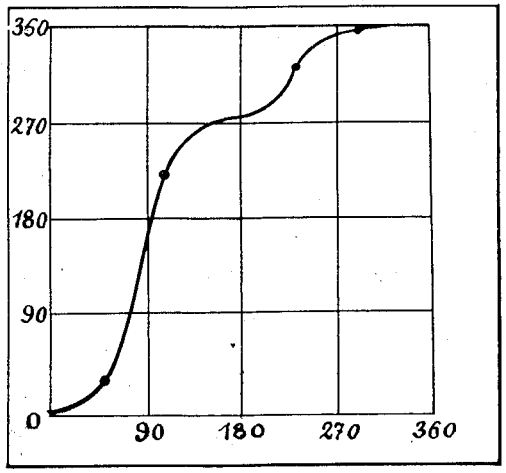
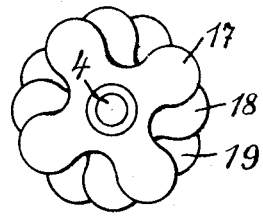
Inventor:
Alexander Kolbassieff March 1, 1932. A. KOLBASSIEFF 1,847,768
DEVICE FOR PRODUCING INTERMITTENT ROTARY MOTION
Filed May 22, 1930   3 Sheets-Sheet 3
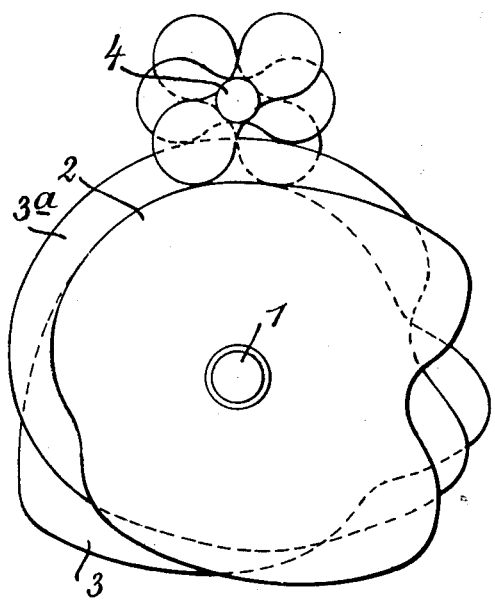
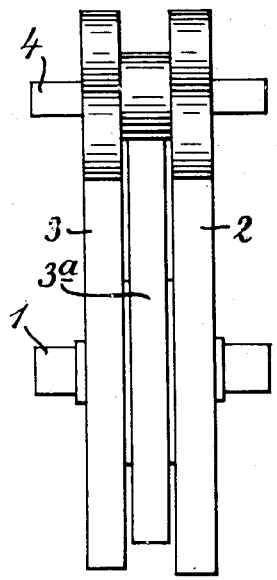
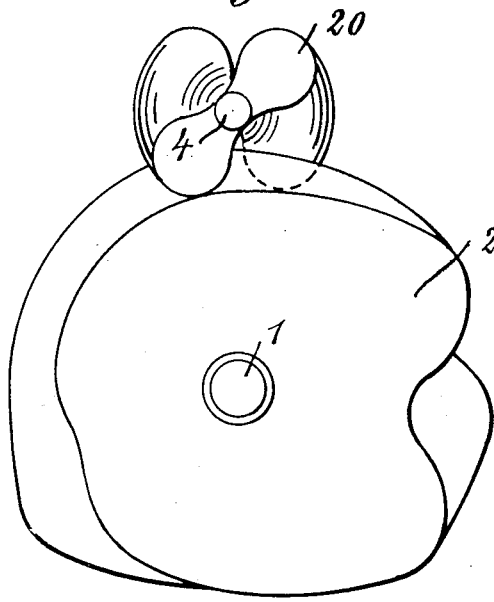
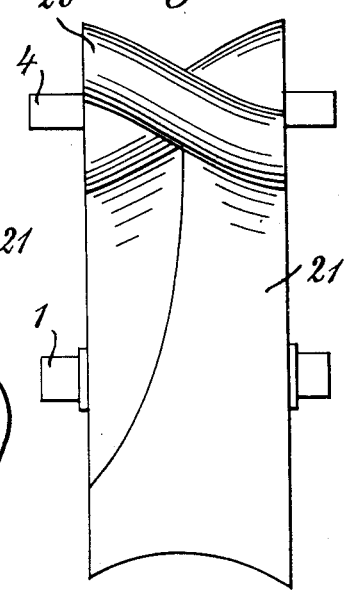
Inventor:
Alexander Kolbassieff Patented Mar. 1, 1932

1,847,768

UNITED STATES PATENT OFFICE

ALEXANDRE KOLBASSIEFF, OF PARIS, FRANCE

DEVICE FOR PRODUCING INTERMITTENT ROTARY MOTION

Application filed May 22, 1930, Serial No. 454,795, and in Germany November 4, 1929.

This invention relates to a device intended to permit of obtaining a periodical rotary motion, that is to say of transforming a continuous rotary motion into fractions of a revolution. My device offers the advantage of doing away with the inconveniences, as, for instance, with the shocks which always occur with the Malta crosses or other similar contrivances hitherto used for the purpose.

In order to make my invention more clearly understood, I have illustrated, as examples, several embodiments thereof in and by drawings appended hereto and wherein;

Fig. 1 is a side view of a first embodiment of my invention;

Fig. 2 is an elevation of the same;

Figs. 3, 4, 5 and 6 show four phases of the motion;

Fig. 7 is a side view of a second embodiment of my invention;

Fig. 8 is an elevation of the same;

Fig. 9 illustrates a third modification;

Fig. 10 is a diagram;

Figs. 11, 12, 13 and 14 show a fourth and a fifth embodiment in side view and in elevation.

My device is composed of a continuously rotating shaft 1 on which are keyed two cams 2 and 3 integral with one another. Said cams serve to actuate the device arranged on a second shaft 4 and made up of two pairs of rollers 5, 6 and 7, 8 arranged crosswise between three plates 9, 10 and 11.

Each cam is provided with a recess 12 and with a projection 13 offset 180° respective on another, the recess of one cam being directly behind the projection of the other.

When the cams are revolving in the direction indicated by Fig. 3, the projection 13 lifts roller 8 while roller 6 engages into recess 12 until the axis of the recess and of the projection is on a straight line between the centers of the two spindles 1 and 4. At this moment, the edge of recess lifts roller 6 until the latter rides on the periphery of cam 3. The result is, therefore, a rotary motion of a quarter of a revolution after the recess and the projection have passed under the rollers. Obviously I can provide the cams with any number of recesses and of projections.

The foregoing device offers the advantage that the rollers ride on the projections and on the edges of the recesses, thereby ensuring a smooth and jerkless motion.

According to the embodiment illustrated by Figs. 7 and 8, cam 2 is provided with two projections 14 and with one recess 15, while cam 3 carries a projection 16 arranged between the two projections 14 of cam 2. Roller 6 rests on cam 2 and roller 8 on cam 3, thereby ensuring stabilization of shaft 4, rendering the latter steady.

When shaft 1 is rotated uniformly and shaft 4 is rotated at a predetermined rate, as, for instance, in accordance with the diagram shown by Fig. 10, the result is that rollers 5, 6, 7 and 8 will describe, on the uniformly rotated cams, curves wherein the times of stabilization of shaft 4 will correspond to the arcs of circle and the times of motion thereof will correspond to the curves. By selecting the required forms for such curves and by suitably shaping the cams, I am enabled to cause shaft 4 to be imparted predetermined motions.

As indicated by Figs. 9, 11 and 12, I may arrange three cams 2, 3 and 3a to actuate three disks 17, 18 and 19 keyed on shaft 4, each disk being formed with two or four teeth or cogs which replace rollers 5, 6, 7 and 8.

If I increase ad infinitum the number of such disks, the driven part will assume the form of a many threaded helicoidal screw 20 and the driving part 21 the form of a corresponding cam (Figs. 13, 14).

As will be apparent, the form and the number of the cams and of the disks may be varied according to the motion or may be made to follow an arbitrarily predetermined law. Obviously too, the ends of the radii of the driving parts and of the driven parts may be made to have different circumferential velocities at their contact points.

What I claim as new and desire to secure by Letters Patent, is:—

1. A device for converting uniform rotary motion into intermittent rotary motion, comprising a driving shaft, a plurality of cam discs having peripheral notches and projections, secured in juxtaposition to said shaft, a driven shaft arranged substantially parallel to the driving shaft, and a pair of radial arms secured to said driven shaft in the plane of each cam disc, said arms arranged so that the end of one arm enters a recess in its disc while another arm co-operates with a projection.

2. A device as claimed in claim 1 wherein the number of discs and pairs of arms is two, the arms being arranged at right angles to each other.

3. A device as claimed in claim 1 wherein the number of discs and pairs of arms is three, the arms being arranged at an angle of 120° relative to one another.

4. A device as claimed in claim 1 wherein the arms are fitted with rollers for co-operation with the cam discs.

In testimony whereof I have signed my name to this specification.

ALEXANDRE KOLBASSIEFF.